Sept. 24, 1929.   A. W. JOHNSON   1,729,341
ENSILAGE DISTRIBUTOR FOR FILLING SILOS
Filed March 28, 1927

INVENTOR.
AARON W. JOHNSON.
BY
ATTORNEY.

Patented Sept. 24, 1929

1,729,341

UNITED STATES PATENT OFFICE

AARON W. JOHNSON, OF WEST BEND, WISCONSIN

ENSILAGE DISTRIBUTOR FOR FILLING SILOS

Application filed March 28, 1927. Serial No. 178,841.

This invention relates to ensilage distributors for use in filling silos.

The general aim of this invention is to provide a simple and effective distributing means utilizing for its sole driving power the force of air and ensilage issuing from the conveyor pipe and at the same time to insure even distribution of the ensilage over the entire floor area of the silo without the necessity of having a person in the silo.

Various attempts have been heretofore made to provide a satisfactory distributor but all have failed to accomplish the desired end. The known distributors which have eliminated the necessity of having a person in the silo have been objectionable in that they required an auxiliary mechanical drive which was impractical due to its complication; and those which have used simple driving means have been incapable of distributing the ensilage over the entire area of the silo without the aid of a person within the silo to manipulate the distributor.

The present invention marks a real advance over prior attempts in that it is of simple construction, insures even distribution of ensilage, and eliminates the service of a person in the silo while it is being filled, which task is both difficult and obnoxious due to the conditions under which the person is working.

One object of the present invention is to provide a distributor which has an adjustable means in the form of a spreading cone to regulate the area over which ensilage can be evenly distributed.

A further object is to provide an article of manufacture which is inexpensive, durable, and of such construction as to permit ready attachment to or detachment from the end of the conveyor pipe, to facilitate the insertion or withdrawal of the conveyor pipe into or out of the silo.

Other objects and advantages will become obvious from the following description of an illustrative embodiment of the present invention.

Figure 1:
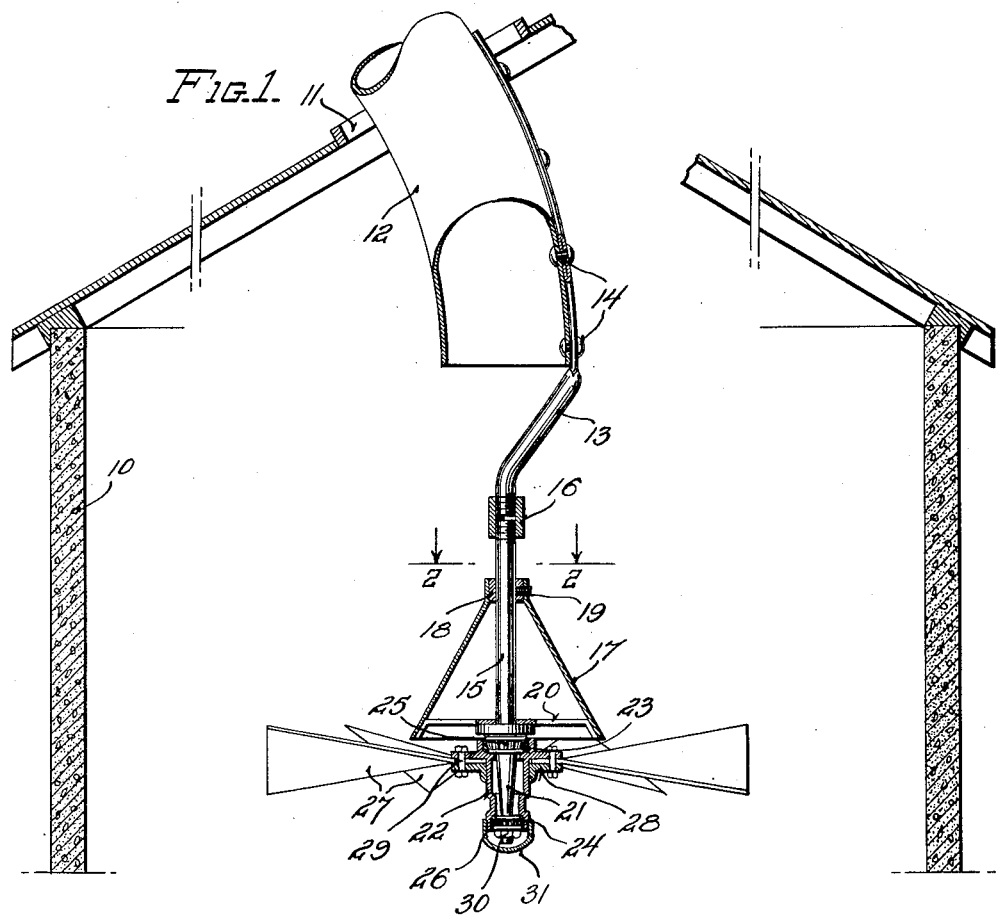
Figure 1 represents a vertical section through a silo showing an embodiment of the present invention in section.
Figure 2:
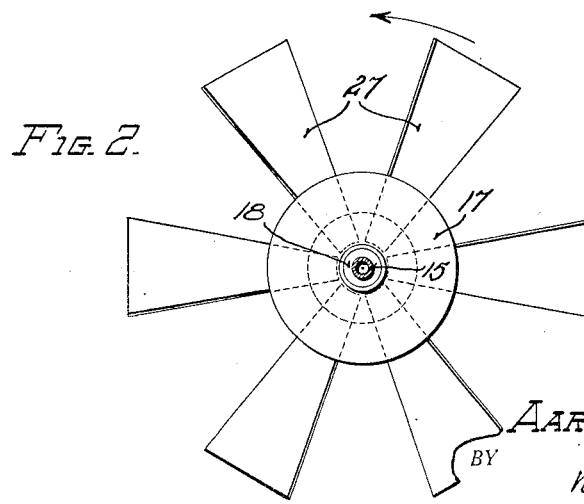
Figure 2 is a horizontal section on the line 2—2 of Figure 1.

In an embodiment of the present invention shown in the accompanying drawings a silo 10 is shown with the usual opening 11 in the roof thereof to permit the insertion of the discharge end of a conveyor pipe 12 through which the ensilage is carried from a cutting machine to the top of the silo, in a manner well known.

An appropriate hanging bracket such as a pipe 13 is secured to the wall of the conveyor pipe 12 in any suitable manner as by rivets 14. The pipe 13 is preferably so formed that its lower extremity is directly beneath the mouth of the conveyor pipe and a shaft 15 is mounted on the pipe 13 by means of a union 16. A spreading cone 17 is secured to a collar 18 which is slidably mounted on the shaft 15.

A set screw 19 extends through the collar 18 to serve as a locking means to position the spreading cone 17 at any desired height. A bracing member 20 is disposed near the base of the spreading cone to insure its rigidity on the shaft.

A spindle 21 is fixedly mounted on the shaft 15 and a hub 22 is provided with a pair of bearing cups 23 and 24 which cooperate with a pair of roller bearings 25 and 26 respectively. A plurality of pitched blades 27 extend radially from the hub and make up the distributing fan and they are secured between the hub 22 and a hub flange 28 by suitable means such as bolts 29. A nut 30 is threaded on to the lower extremity of the spindle and serves to retain the hub in proper position, a hub cap 31 is provided to act as a dust excluding member to insure free running of the bearings on which the hub is mounted.

The operation of the distributor herein before described is of vital significance as it represents a marked improvement over prior attempts to solve the problem at hand, namely, to provide a distributor which will permit the filling of a silo without the necessity of having a person in it to manipulate the distributor to insure even distribution of the ensilage in the silo.

The sole driving power for the distributing fan is the force of the air and ensilage issuing from the conveyor pipe striking the pitched blades of the fan causing the same to rotate freely on the spindle. The force of the rotating distributing fan throws the ensilage and causes it to be distributed evenly over the entire floor area of the silo.

By adjusting the height of the spreading cone above the fan the area over which the ensilage can be distributed may be regulated. When a silo of comparatively small diameter is to be filled the cone may be set close to the fan (as shown in the drawing), if however the silo is of a large diameter the spreading cone must be raised in order to insure the ensilage being thrown a sufficient distance to cover the entire floor area of the silo. It is by virtue of this adjustable spreading cone that even distribution of ensilage may be had over the entire area of the silo regardless of its diameter.

The theory upon which this principle is based is a simple one and may well be here incorporated to more clearly illustrate the operation of the present invention. Regardless of the volume of air and ensilage that the conveyor pipe is delivering to the fan there is no variation between the angular velocity of the tip and base of the blade; however it is a well established fact that the linear velocity of a point on the blade varies in direct proportion to its distance from the center of the fan. Hence the maximum linear velocity of a point on the blade is at its tip. With this principle in mind it may readily be seen that as the spreading cone is raised from the fan the air and ensilage is directed to a point nearer the tips of the blades of the fan and hence by virtue of the increasing linear velocity of such point the ensilage impacting near the tip of the blade is thrown a greater distance thus insuring distribution of the ensilage over a larger area than was possible when the base of the spreading cone was in close proximity with the fan.

While the invention had been described at length in the foregoing specification it is understood that various changes may be made in the present embodiment without departing from the spirit of the invention as hereinafter claimed.

I claim:

1. The combination with an ensilage conveyor pipe having a downturned outlet end, a distributor fan supported beneath said end and having laterally inclined radial blades extending substantially horizontally, said distributor fan being actuated solely by the discharge from said pipe, the spread of said fan greatly exceeding the diameter of said outlet end, and a spreader cone interposed between said outlet end and fan for directing the ensilage toward the periphery of said fan to insure even distribution of the ensilage over the entire area of the silo.

2. The combination with an ensilage conveyor pipe having a downturned outlet end, a distributor fan supported beneath said end and having laterally inclined radial blades extending substantially horizontally, said distributor fan being actuated solely by the discharge from said pipe, the spread of said fan greatly exceeding the diameter of said outlet end, a spreader cone interposed between said outlet end and fan for directing ensilage toward the periphery of said fan, and adjustable means for supporting said spreader cone to permit vertical adjustment thereof to insure even distribution of the ensilage over the entire area of the silo.

In witness whereof, I hereunto subscribe my name this 24 day of March, 1927.

AARON W. JOHNSON.